(12) United States Patent
Padala et al.

(10) Patent No.: US 9,934,076 B2
(45) Date of Patent: *Apr. 3, 2018

(54) SYSTEMS AND METHODS FOR FINDING SOLUTIONS IN DISTRIBUTED LOAD BALANCING

(71) Applicant: VMware, Inc., Palo Alto, CA (US)

(72) Inventors: Pradeep Padala, Sunnyvale, CA (US); Aashish Parikh, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/981,819

(22) Filed: Dec. 28, 2015

(65) Prior Publication Data

US 2016/0224395 A1    Aug. 4, 2016

Related U.S. Application Data

(63) Continuation of application No. 13/714,761, filed on Dec. 14, 2012, now Pat. No. 9,223,608.

(51) Int. Cl.
*G06F 9/46*    (2006.01)
*G06F 9/50*    (2006.01)
*G06F 9/455*   (2018.01)

(52) U.S. Cl.
CPC ........ *G06F 9/5088* (2013.01); *G06F 9/45533* (2013.01); *G06F 9/45558* (2013.01); *G06F 9/5077* (2013.01); *G06F 2009/4557* (2013.01); *G06F 2009/45595* (2013.01)

(58) Field of Classification Search
CPC .............. G06F 9/5088; G06F 9/45533; G06F 9/45558; G06F 9/5077; G06F 2009/4557; G06F 2009/45595
USPC .......................................................... 718/1
See application file for complete search history.

(56) References Cited

U.S. PATENT DOCUMENTS

| | | |
|---|---|---|
| 5,950,230 A | 9/1999 | Islam et al. |
| 8,843,933 B1 | 9/2014 | Holler et al. |
| 2009/0144404 A1* | 6/2009 | Wolman ............... G06F 9/5083 709/223 |
| 2013/0339956 A1 | 12/2013 | Murase |
| 2014/0282519 A1* | 9/2014 | Apte .................. G06F 9/45533 718/1 |

* cited by examiner

*Primary Examiner* — Camquy Truong

(57) ABSTRACT

Systems and methods for finding solutions exhaustively in distributed load balancing are provided. A plurality of virtual machines (VMs) is in communication with a virtual machine management server (VMMS). The VMMS is configured to generate a matrix that represents a mapping of a plurality of virtual machines (VMs) to a plurality of hosts and to calculate a first imbalance metric of the matrix. The VMMS is also configured to identify a plurality of candidate migrations the VMs. The VMMS searches through the solution space efficiently and can perform an exhaustive search to find the optimal solution. For each candidate migration, the VMMS is configured to alter the matrix to represent the candidate migration and to calculate a candidate imbalance metric based on the altered matrix. The VMMS is also configured to determine which candidate migration to perform based at least in part on the candidate imbalance metric for each candidate migration and the first imbalance metric.

20 Claims, 2 Drawing Sheets

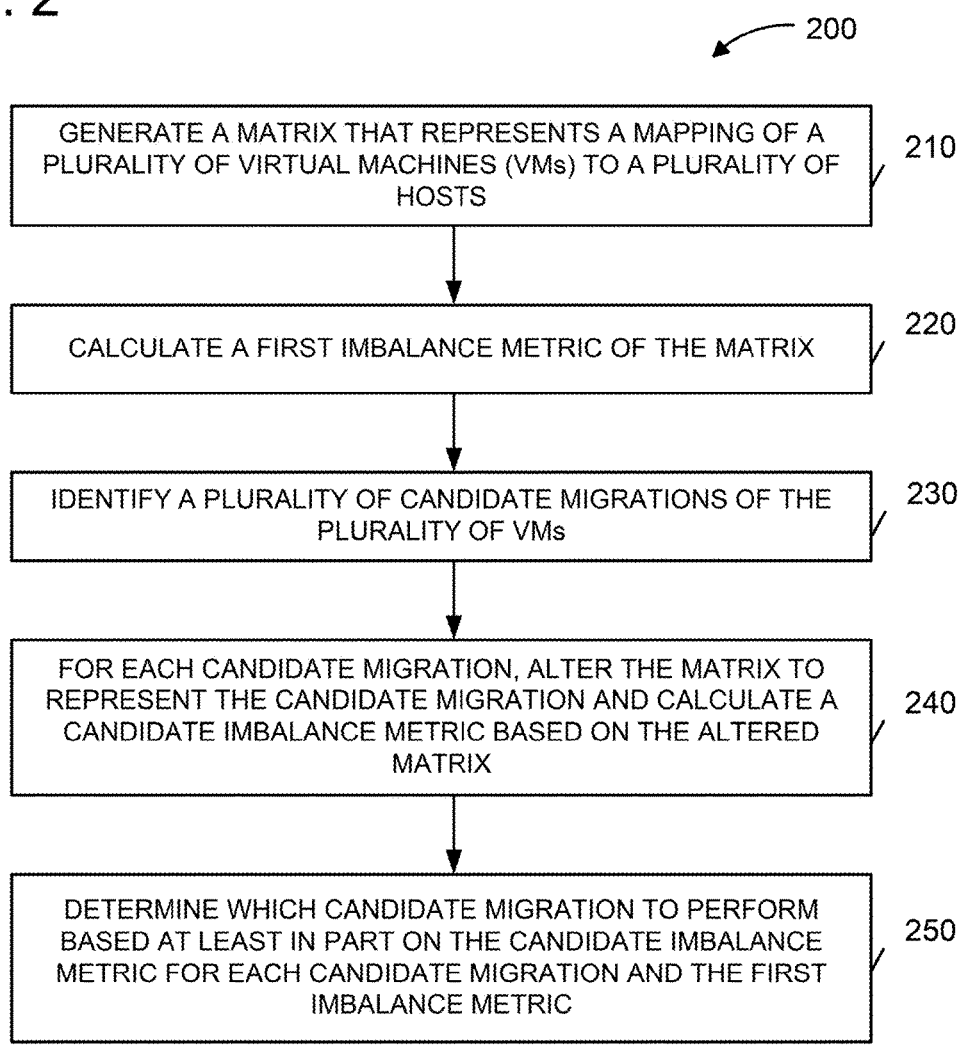

SYSTEMS AND METHODS FOR FINDING SOLUTIONS IN DISTRIBUTED LOAD BALANCING

CROSS-REFERENCE TO RELATED APPLICATION

This application is a continuation of and claims priority from U.S. application Ser. No. 13/714,761, filed on Dec. 14, 2012, entitled "SYSTEMS AND METHODS FOR FINDING SOLUTIONS IN DISTRIBUTED LOAD BALANCING," the contents of which is incorporated herein by reference in its entirety.

BACKGROUND

Virtual machines are an abstraction of physical computing resources and they may each include a guest operating system that operates therein. Datacenters may include thousands, tens of thousands, or more virtual machines that are operating concurrently. Improving the performance or efficiency of the virtual machines sometimes involves distributing the virtual machines among a cluster of hosts to balance the load. Known methods for determining how to distribute virtual machines within a cluster include a greedy, hill-climbing algorithm, among others. Some known methods use a decision tree to find solutions, but are limited to exploring a fixed depth of the decision tree. Accordingly, there is a need for improved methods and systems for exhaustively searching for solutions in distributed load balancing. A solution found through exhaustive searching can provide more insight into the efficiency of greedy and other algorithms mentioned above.

SUMMARY

Systems and methods for finding solutions in distributed load balancing are provided. A plurality of applications is in communication with a management server. The management server is configured to generate a matrix that represents a mapping of the plurality of applications to a plurality of hosts and to calculate a first imbalance metric of the matrix. The management server is also configured to identify a plurality of candidate migrations. For each candidate migration, the management server is configured to alter the matrix to represent the candidate migration and to calculate a candidate imbalance metric based on the altered matrix. The management server is also configured to determine which candidate migration to perform based at least in part on the candidate imbalance metric for each candidate migration and the first imbalance metric.

BRIEF DESCRIPTION OF THE DRAWINGS

FIG. 2 is a flowchart of an exemplary method for finding solutions in distributed load balancing of the virtual infrastructure of FIG. 1.

DETAILED DESCRIPTION

Figure 1:
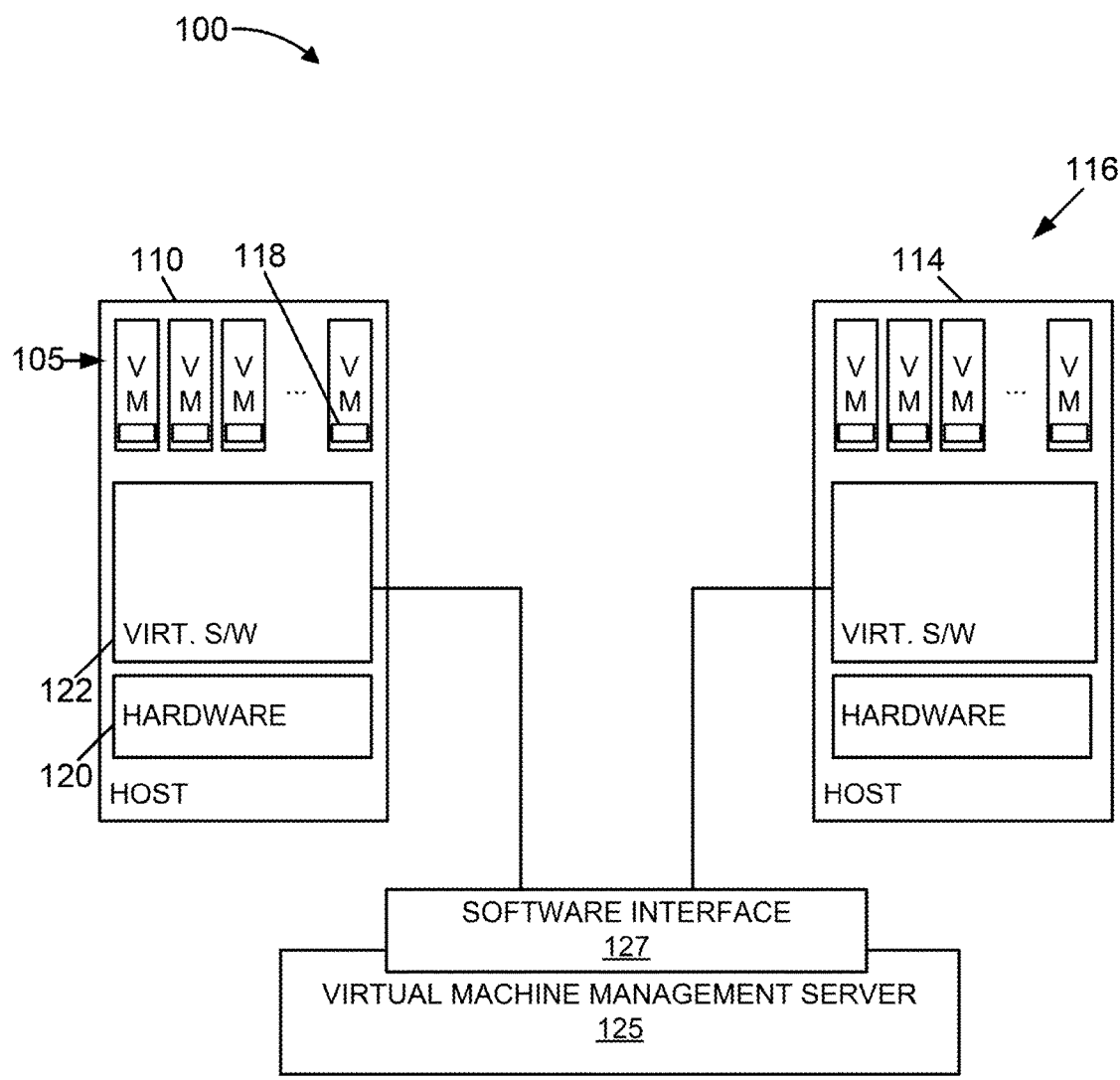
FIG. 1 is an exemplary virtual infrastructure having a plurality of virtual machines and a plurality of guest operating systems.

Embodiments provided herein enable system administrators to perform a fast exhaustive search of the solutions space for possible distributions of virtual machines within a cluster of physical machines. An efficient data structure may be used with an incrementally updated metric to find solutions in distributed load balancing. The solutions may be applied to clusters such that virtual machines are moved to hosts in accordance with a solution. The methods and systems described herein may be used as an offline or online analysis tool.

FIG. 1 is an exemplary virtual infrastructure 100 having a plurality of virtual machines (VMs) 105 on physical computer systems, or hosts, 110 and 114, collectively known as a cluster 116. The cluster 116 may include any number of hosts. Each VM 105 provides a virtual environment wherein a guest operating system 118 may reside and operate. Each physical computer 110 and 114 includes hardware 120, virtualization software or manager 122 running on hardware 120, and one or more VMs 105 executing on the hardware 120 by way of virtualization software 122. The virtualization software 122 is therefore logically interposed between, and interfaces with, the hardware 120 and the VMs 105. The virtualization software 122 may be implemented wholly or in part in hardware, e.g., as a system-on-a-chip, firmware, field programmable gate array (FPGA), etc. The hardware 120 includes at least one processor (not shown), wherein each processor is an execution unit, or "core," on a microprocessor chip. The hardware 120 also includes a system memory (not shown), which is a general volatile random access memory (RAM), a network interface port (NIC) (not shown), a storage system (not shown), and other devices.

The virtualization software 122 is sometimes referred to as a hypervisor, and includes software components for managing hardware resources and software components for virtualizing or emulating physical devices to provide virtual devices, such as virtual disks, virtual processors, virtual network interfaces, etc., for each VM 105. In the exemplary embodiment, each VM 105 is an abstraction of a physical computer system and may include an operating system (OS) 118, such as Microsoft Windows® and applications, which are referred to as the "guest OS" 118 and "guest applications," respectively, wherein the term "guest" indicates it is a software entity that resides within the VM. Microsoft Windows® is a registered trademark of the Microsoft Corporation of Redmond, Wash.

A Virtual Machine Management Server (VMMS) 125 provides a software interface 127 that, among other things, allows users and other programs to control the lifecycle of VMs 105 running on physical computers 110 and 114 that are managed by the VMMS 125. The VMMS 125 may provide other VM management and manipulations than those specifically mentioned here. The VMMS 125 may include products such as vCenter®, available from VMware, Inc. of Palo Alto, Calif. In addition, vCenter® is a registered trademark of VMware, Inc.

The VMs 105 may be distributed and re-distributed across the cluster 116 to improve performance or efficiency of the VMs 105 and/or the cluster 116. The VMMS 125 may be configured to move, or migrate, the VMs 105 from one host to another host. In balancing the load across the cluster 116, the VMMS 125 may analyze the cluster 116 to determine a new distribution of the VMs 105. In determining the new distribution, the VMMS 125 explores a solution space that may include all possible combinations of VMs 105 and hosts. The VMMS 125 may restrict the solution space to solutions that require a pre-determined number of VM migrations, or fewer, in order to respect the cost-benefit trade-off of migrating VMs as compared to the imbalance metric of the new distribution.

In the exemplary embodiment, the VMMS 125 evaluates all possible cluster configurations and recommends VM migrations that lead to an optimal configuration. The optimal configuration is one that maximally reduces imbalance while also respecting the cost-benefit trade-off. The VMMS 125 is configured to use an efficient data structure and an efficient algorithm to evaluate possible configurations and find a solution.

The VMMS 125 is configured to use a matrix to represent mappings of VMs 105 to hosts. The matrix is a potentially sparse bit-matrix, representing an incidence matrix of host to VM mappings. The matrix data structure CB is an n×m bit-matrix where $CB_{ij}=1$ if $VM_j$ is placed on $Host_i$. One or more bitset libraries may be used to improve the efficiency of the matrix. The following operations may be performed on the matrix:

getColumn(int col): returns the column col, which represents the incidence vector of a particular VM;

getRow(int row): returns the row row, which represents the incidence vector for a particular host, describing which VMs are on $Host_{row}$;

numBitsInRow(int row): returns the number of bits set in row row, which represents the number of VMs on $Host_{row}$; and flip(BitMatrix b, int row, int col): flips the bit at location (row, col) in the matrix b.

In order to bound the time for an exhaustive search of the solution space, the VMMS 125 may be configured to use pruning and heuristics to quickly evaluate proposals in the solution space. An optimization technique to speed up computer programs, such as memorization, may also be used to avoid unnecessary computations. In the exemplary embodiment, the VMMS 125 is configured to use a depth-bound algorithm to realize a decision tree that enables methodical enumeration of all configurations that are k—adjacent to the current state of the matrix. Two configurations may be called k—adjacent if the least number of VM migrations needed to transform one to the other is k. In other words, in the exemplary embodiment, k serves as the depth-bound to the search algorithm as representing the maximum number of VM migrations that the user would like to consider. The value of k may be configurable by the administrator of the VMMS 125.

In the exemplary embodiment, the presence of any VM on any host is treated identically, for purposes of simplicity. Thus, the imbalance metric is based on the number of VMs 105 per host. Alternatively, the imbalance metric may be based on a relative distribution of entitlements of a single resource type or on a combined metric that tracks the relative distribution of multiple types of resources. In some implementations, the actual resource demands are used to calculate imbalance.

The VMMS 125 considers a proposed solution by flipping the appropriate bits in the matrix to represent a new "what if" state of the cluster 116. The imbalance metric of the transformed matrix is incrementally computed using the following formula, which operates in O(1) time:

$$\sigma_2 = \sqrt{\sigma_1^2 + \frac{2}{N}(v_j - v_i + k^2)} \quad \text{Eq. 1}$$

where: $\sigma_2$: standard deviation of the child matrix on the decision tree;

$\sigma_1$: standard deviation of the parent matrix on the decision tree;

$v_j$: number of VMs on destination $Host_j$ before migration;

$v_i$: number of VMs on source $Host_i$ before migration;

k: number of VMs being migrated from $Host_i$ to $Host_j$ and

N: number of samples (hosts or rows in the matrix).

Cost-benefit analysis trades off migration-induced downtime and drop in payload versus the improved payload of the migrating VM (and source host) once the migration is complete over the time left in the current invocation interval of the algorithm, or the "benefit time." The cost-benefit analysis may also be performed in incremental fashion similar to how the imbalance metric is calculated. The VMMS 125 may be configured to implement the pseudocode listed in Listing 1 below.

Listing 1

```
Input: current state of VMs represented by matrix
Input: depth of recursion (initialized to 0)
I_c ← σ(N_h) /* standard deviation over all hosts */
BestState ← NULL
while depth != maxMigrations do
    states = genState(mig); /* Generate all states that are 1-adjacent to the current state */
    foreach s in states do
        PruneState(s, affinityRules);
        I_s = ComputeImbalance(s);
        Cost_s = ComputeCost(s);
        Benefit_s = ComputeBenefit(s);
        if Benefit_s > Cost_s and I_s < I_c then
            BestState ← s
            I_c = I_s
        end
        recursive_call(s, depth + 1);
    end
end
Return the migrations required to achieve BestState
```

FIG. 2 is a flowchart of an exemplary method 200 for finding solutions in distributed load balancing using the infrastructure of FIG. 1. In operation 210, the VMMS 125 creates a 2×2 matrix to represent each VM 105 and each host 110 and 114, and the presence of a VM on a host. In operation 220, the VMMS 125 calculates a first imbalance metric for the matrix, for example, using the standard deviation of the matrix. The VMMS 125 exhaustively searches all possible migrations in a search space that is limited by a pre-determined number of maximum migrations. More particularly, the VMMS 125 identifies, in operation 230, a plurality of candidate migrations of the VMs 105. Each candidate migration is subject to the pre-determined number of maximum migrations or fewer migrations. For example, if the pre-determined number of maximum migrations is four, the plurality of candidate migrations includes all possible migrations or combinations of migrations that include four or fewer migrations.

For each candidate migration, the VMMS 125, in operation 240, alters the matrix to represent each candidate migration (i.e., by flipping bits as appropriate) and calculates a candidate imbalance metric based on the altered matrix, for example, using Eq. 1. In operation 250, the VMMS 125 determines the candidate migration having the lowest imbalance metric as compared to all other candidate migrations and the first imbalance metric (i.e., the imbalance of the present cluster of VMs). The VMMS 125 may further calculate a cost and benefit for each candidate migration and determine the candidate migration to perform by determining the candidate migration having the lowest imbalance and having a benefit that is greater than its cost.

The VMMS 125 may cause the determined candidate migration to be performed. In the exemplary embodiment, the VMMS 125 uses a recursive breadth-first search to identify each candidate migration, or solution. For example, the VMMS 125 may incrementally calculate an imbalance metric for each candidate migration. Then, the VMMS 125 may determine the lowest imbalance metric by comparing the current imbalance metric with a current best imbalance metric and setting the current best imbalance metric to the current imbalance metric if the current imbalance metric is lower. Candidate migrations with a cost that is higher than a benefit may be ignored, and thus the search space may be reduced.

Exemplary Operating Environment

The detection and reporting of system exceptions as described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules, or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for detecting system exceptions.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A virtual infrastructure comprising:
a plurality of applications; and
a management server comprising a processor configured to:
generate a matrix that represents a mapping of said plurality of applications to a plurality of hosts;
calculate a first imbalance metric of the matrix;
identity a plurality of candidate migrations of said plurality of applications;
for each of the plurality of candidate migrations, alter the matrix to represent the candidate migration and calculate a candidate imbalance metric based on a standard deviation of the altered matrix;
determine a cost and a benefit for each of the plurality of candidate migrations; and
determine which of the plurality of candidate migrations to perform based at least in part on the following: the candidate imbalance metric for each of the plurality of candidate migrations and the first imbalance metric, and whether the determined benefit is greater than the determined cost.

2. The virtual infrastructure of claim 1, wherein said management server is further configured to identify the plurality of candidate migrations by identifying each of the plurality of candidate migrations that include a single migration.

3. The virtual infrastructure of claim 1, wherein said management server is further configured to calculate the candidate imbalance metric based at least in part on a number of said plurality of applications on a source host before migration.

4. The virtual infrastructure of claim 1, wherein said management server is further configured to calculate the candidate imbalance metric based at least in part on a number of said plurality of applications on a destination host before migration.

5. The virtual infrastructure of claim 1, wherein said management server is further configured to perform the determined candidate migration.

6. The virtual infrastructure of claim 1, wherein identifying a plurality of candidate migrations comprises identifying a plurality of candidate migrations that do not exceed a predefined number of maximum migrations.

7. The virtual infrastructure of claim 1, wherein calculating a candidate imbalance metric further comprises calculating a candidate imbalance metric based at least in part on a relative distribution of entitlements of a single resource type or on a combined metric that tracks a relative distribution of multiple types of resources.

8. A method comprising:
generating a matrix that represents a mapping of a plurality of applications to a plurality of hosts;
calculating a first imbalance metric of the matrix;
identifying a plurality of candidate migrations of the plurality of applications;
for each of the plurality of candidate migrations, altering the matrix to represent each of the plurality of candidate migrations and calculate a candidate imbalance metric based on a standard deviation of the altered matrix;
determining a cost and a benefit for each of the plurality of candidate migrations; and
determining which of the plurality of candidate migrations to perform based at least in part on the following: the candidate imbalance metric for each of the plurality of candidate migrations and the first imbalance metric, and whether the determined benefit is greater than the determined cost.

9. The method of claim 8, further comprising identifying the plurality of candidate migrations by identifying each of the plurality of candidate migrations that include a single migration.

10. The method of claim 8, further comprising calculating the candidate imbalance metric based at least in part on a number of the plurality of applications on a source host before migration.

11. The method of claim 8, further comprising calculating the candidate imbalance metric based at least in part on a number of the plurality of applications on a destination host before migration.

12. The method of claim 8, wherein identifying a plurality of candidate migrations comprises identifying a plurality of candidate migrations that do not exceed a predefined number of maximum migrations.

13. The method of claim 8, wherein calculating a candidate imbalance metric further comprises calculating a candidate imbalance metric based at least in part on a relative distribution of entitlements of a single resource type or on a combined metric that tracks a relative distribution of multiple types of resources.

14. One or more non-transitory computer-readable storage mediums having computer-executable instructions embodied thereon, which, when executed by at least one processor, cause the at least one processor to:
generate a matrix that represents a mapping of a plurality of applications to a plurality of hosts;
calculate a first imbalance metric of the matrix;
identify a plurality of candidate migrations of the plurality of applications;
for each of the plurality of candidate migrations, alter the matrix to represent each of the plurality of candidate migrations and calculate a candidate imbalance metric based on a standard deviation of the altered matrix;
determine a cost and a benefit for each of the plurality of candidate migrations; and
determine which of the plurality of candidate migrations to perform based at least in part on the following: the candidate imbalance metric for each of the plurality of candidate migrations and the first imbalance metric, and whether the determined benefit is greater than the determined cost.

15. The one or more non-transitory computer-readable storage mediums of claim 14, wherein the computer-executable instructions further cause the at least one processor to identify the plurality of candidate migrations by identifying each of the plurality of candidate migrations that include a single migration.

16. The one or more non-transitory computer-readable storage mediums of claim 14, wherein the computer-executable instructions further cause the at least one processor to calculate the candidate imbalance metric based at least in part on a number of the plurality of applications on a source host before migration.

17. The one or more non-transitory computer-readable storage mediums of claim 14, wherein the computer-executable instructions further cause the at least one processor to calculate the candidate imbalance metric based at least in part on a number of the plurality of applications on a destination host before migration.

18. The one or more non-transitory computer-readable storage mediums of claim 14, wherein identifying a plurality of candidate migrations comprises identifying a plurality of candidate migrations that do not exceed a predefined number of maximum migrations.

19. The one or more non-transitory computer-readable storage mediums of claim 14, wherein calculating a candidate imbalance metric further comprises calculating a candidate imbalance metric based at least in part on a relative distribution of entitlements of a single resource type or on a combined metric that tracks a relative distribution of multiple types of resources.

20. The one or more non-transitory computer-readable storage mediums of claim 14, wherein the computer-executable instructions further cause the at least one processor to:
determine a cost and a benefit of each of the plurality of candidate migrations; and
determine which candidate migration to perform by determining if the benefit is greater than the cost.

* * * * *